United States Patent [19]
Fisher et al.

[11] Patent Number: 5,782,320
[45] Date of Patent: Jul. 21, 1998

[54] TOUGHENED CARBON COMPOSITE BRAKE DISCS

[75] Inventors: Ronald Fisher, Rugby; Thomas Gerard Fennell, Coventry; Maurice James Evans, Lichfield, all of England

[73] Assignee: Dunlop Limited, London, United Kingdom

[21] Appl. No.: 882,958

[22] Filed: Jun. 26, 1997

Related U.S. Application Data

[60] Continuation of Ser. No. 593,485, Jan. 29, 1996, abandoned, which is a division of Ser. No. 128,571, Sep. 30, 1993, Pat. No. 5,503,254.

[30] Foreign Application Priority Data

Sep. 30, 1992 [GB] United Kingdom ............... 9220603

[51] Int. Cl.$^6$ ........................................... B00T 1/06
[52] U.S. Cl. .......................... 188/18 A; 188/218 XL
[58] Field of Search .................. 188/71.5, 251 A, 188/251 R, 218 XL, 18 A; 192/107 M

[56] References Cited

U.S. PATENT DOCUMENTS

| | | | |
|---|---|---|---|
| 3,871,934 | 3/1975 | Marin . | |
| 3,932,568 | 1/1976 | Watts et al. | 192/107 M X |
| 4,002,225 | 1/1977 | Marin . | |
| 4,291,794 | 9/1981 | Bauer | 192/107 M |
| 4,700,823 | 10/1987 | Winckler | 192/107 M |
| 4,780,363 | 10/1988 | Evans et al. | 28/112 X |
| 4,790,052 | 12/1988 | Olry | 28/110 |
| 4,878,563 | 11/1989 | Baden et al. . | |
| 4,955,123 | 9/1990 | Lawton et al. | 29/419.1 |
| 4,983,451 | 1/1991 | Sugino et al. | 422/283 |
| 5,143,184 | 9/1992 | Snyder et al. | 188/218 X |
| 5,217,770 | 6/1993 | Morris, Jr. et al. | 188/71.5 X |
| 5,312,660 | 5/1994 | Morris et al. | 188/71.5 X |
| 5,360,638 | 11/1994 | Lequertier | 427/257 |
| 5,382,392 | 1/1995 | Prevorsek et al. | 264/29.5 |

FOREIGN PATENT DOCUMENTS

| | | |
|---|---|---|
| 0300756 | 1/1989 | European Pat. Off. . |
| 1126445 | 5/1989 | Japan . |
| 1311537 | 3/1973 | United Kingdom . |
| 1336055 | 11/1973 | United Kingdom . |
| 1393133 | 5/1975 | United Kingdom . |
| 1544994 | 4/1979 | United Kingdom . |
| 2099365 | 12/1982 | United Kingdom . |
| 2174774 | 12/1986 | United Kingdom . |

*Primary Examiner*—Lee W. Young
*Attorney, Agent, or Firm*—Stevens, Davis, Miller & Mosher, L.L.P.

[57] ABSTRACT

An aircraft disc stack (1) comprises a plurality of interleaved stator and rotor discs (3,4) keyed respectively to a torque tube (5) and a wheel hub (not shown). The stack (1) further comprises bi-functional friction/load-transmitting discs in the form of end stator discs (10,13). These discs (10,13) are subject to uneven loading because the non-friction surfaces (12,15) are in use compressed on areas less than the load bearing areas of the opposing friction faces (11,14). This can lead to premature disc failure and in the past load spreader plates have been used to distribute loading over these areas to minimize the risk of failure. In this invention portions of the load bearing areas of non-friction surfaces (12,15) are toughened ie: material underlying these surfaces is toughened, to increase their resistance to deformation, fracture and/or wear thereby removing the need for additional load spreader plates which were hitherto required.

20 Claims, 1 Drawing Sheet

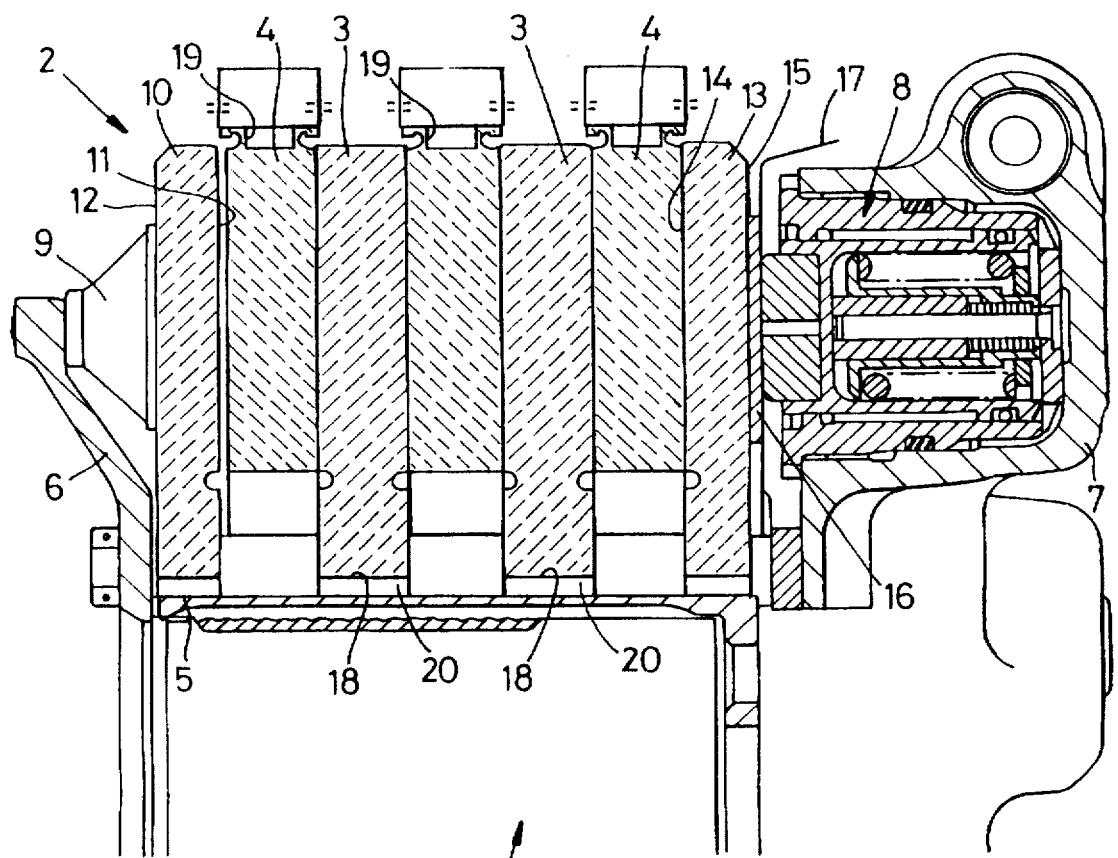
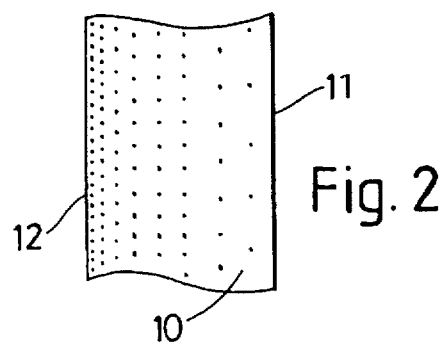

TOUGHENED CARBON COMPOSITE BRAKE DISCS

This application is a continuation of application Ser. No. 08/593,485, filed Jan. 29, 1996 (abandoned), which is a Rule 60 Divisional of Ser. No. 08/128,571, filed Sep. 30, 1993, now U.S. Pat. No. 5,503,254.

BACKGROUND OF THE INVENTION

This invention relates to composite brake discs generally and to carbon composite discs for use in aircraft brake assemblies-in particular.

The form and construction of aircraft brake assemblies is well known and ordinarily comprises a disc stack having a plurality of annular non-rotatable stator discs interleaved with an associated number of annular rotatable rotor discs, and thrust-applying means arranged to displace the disc stack so as to bring the stator and rotor discs into frictional engagement. Typically the thrust-applying means comprises a torque tube which passes through said annular discs having a reaction flange extending radially from one end against which the discs are urged, and a ring of hydraulic 'brake' cylinders displaced radially from, and rigidly attached to, the other end of said tube.

Discs of the stack must be able to generate friction forces and withstand torque loads, heat generated and the axial 'thrust' load applied to them, directly or indirectly, by the brake cylinders and reaction flange. Carbon composite discs are ordinarily used because they can withstand operating temperatures in excess of 1000 degrees Celsius while maintaining the required value of friction coefficient.

Such composite materials are well known and are ordinarily of the carbon-carbon type in which carbon is reinforced by filamentary carbon possibly in the form of carbonized cloth or tape. However such materials in the form of discs, although able to withstand the required axial load if evenly distributed across a wide area, are unable to withstand high localized loads without damage. In the extreme, indention by plastic deformation or wear of the discs may cause a disc to fracture and/or break up.

Localized axial loads are usually not to be found in the body of the stack where 'friction face' abutts 'friction face' but at the ends of the stack where the end stator discs each have a first inwardly facing friction face and an outwardly facing load transmitting face. The load transmitting faces of the end stator discs are subject to respective axial loads from either the reaction flange or from the brake cylinders. In order to distribute the load from the reaction flange an annular reaction plate which acts as a load spreader is used. This plate is made-of a suitable metal and disposed between the flange and its adjacent end stator disc. Likewise one or more annular spreader plates are disposed between the brake cylinders and their adjacent end stator disc.

Normally because of the relative size of the abutting spreader plate or reaction plate to that of the respective end stator disc, only about 50% of each disc thrust face is subject to axial load. Thus, it is likely that some warping of the disc will occur as a consequence of either this uneven loading or perhaps from the differential cooling that such abutment will precipitate. This can result in uneven wear and possible failure of the discs.

In practice carbon composite discs can readily survive cycling to and from high operating temperatures, however this is not the case with reaction or spreader plates. Permanent thermal distortion may occur in these plates which will lead to uneven application of load to the end stator discs, possibly obviating the advantage of using such plates in the first place. To overcome this disadvantage it has been suggested in U.S. Pat. No. 4,878,563 to construct an interconnected end stator disc and spreader plate, joined by a mechanical attachment which allows for thermal expansion. However, this assembly fails to overcome a further disadvantage which is that metal plates readily conduct heat from the disc pack to the hydraulic brake cylinder and piston assemblies which could lead to their premature failure.

If a brake disc could be constructed, of predominantly carbon composite, which was in one piece and was sufficiently resilient to deformation or resistant to fracture by localized loads, then the existing reaction or spreader plates would no longer be required thereby overcoming some if not all of the aforesaid disadvantages. It is an object of the invention to provide such a disc.

SUMMARY OF THE INVENTION

According to a first aspect of the invention, a bi-functional carbon composite disc for or when used as a fitment at the end of a brake disc stack comprises a first non-toughened carbon-carbon friction face and an opposing load transmitting surface, characterized in that at least a portion of said surface is toughened to provide increased resistance to deformation, fracture, and/or resistance to wear.

According to a further aspect of the invention an annular carbon composite disc for a brake disc stack comprises outer and inner peripheral edge surfaces; characterized in that at least a portion of at least one which is toughened to provide increased resistance to deformation, fracture and/or resistance to wear.

Preferably, said portion is the whole of said surface, and suitable toughening is provided by needle punching, and/or a chemical treatment process.

One such treatment is a chemical process which may effect localized conversion of carbon to a harder or stiffer substance. The treatment could be thermochemical, such as siliconizing or chromizing; liquid impregnation, such as by resin which may be subsequently charred, or by metal or metalloid; or by material deposition following infiltration by a gaseous phase.

As a consequence of treatment said portion may be provided with a coating as a result of said treatment. Suitable toughening may be effected during a fibre manipulation process prior to the formation of the carbon composite.

The invention will now be described with reference to the accompanying drawing in which:

BRIEF DESCRIPTION OF THE DRAWINGS

FIG. 1 illustrates in partial section a brake disc assembly comprising end stator discs in accordance with a preferred emit of the invention; and FIG. 2 illustrates in partial section an end stator disc 10 of FIG. 1.

DETAILED DESCRIPTION OF A PREFERRED EMBODIMENT

A brake disc assembly 1 comprises an annular disc stack generally denoted 2 comprising a plurality of interleaved double stator discs 3 and rotor discs 4, with said discs manufactured from carbon composite material. It further comprises a non-rotatable torque tube 5 extending axially through the disc stack 2 with a reaction flange 6 extending radially from its axially inner end. Attached to and extending radially from the outer end of the torque tube 2 is a ring of brake cylinders 7, each having a corresponding piston assembly 8. Opposing each such piston assembly 8 is a corresponding frusto-conically shaped reaction member 9 attached at its axially outer end to the reaction flange 6 and with the disc stack 2 being disposed intermediate the piston assemblies 8 and reaction members 9.

At one end of the disc stack 2 an end or thrust stator bi-functional disc 10 has an carbon-carbon friction face 11 and an outer toughened load transmitting surface 12 which abuts the reaction members 9. At the other end of the disc stack 2 there is provided an end or pressure stator bi-functional disc 13 which has an carbon-carbon friction face 14 and an outer toughened load transmitting surface 15 which engages an annular heat insulating disc 16 disposed between said ring of pistons assemblies 8 and the end stator disc 13. A heat shield 17 is attached to the axially outer surface of the insulating disc 16. The aforesaid discs 10,13 function both as friction discs at non-toughened friction faces thereof and to receive external loading axially applied to the disc stack 2 and are consequently described herein as bi-functional. Alternatively, in some constructions, the insulating disc 16 may be omitted, with the transmitting surface 15 directly engaging the heat shield 17.

The inner periphery of the stator discs 3 extend radially inwardly from the corresponding periphery of the rotor discs 4 and engage torque transmitting keyways in the torque tube 5. Consequently the stator discs 3 are rotationally fixed relative to the torque tube. The rotor discs 4 are free to rotate about torque tube 5 but are keyed at their outer periphery to an associated wheel rim (not shown) so as to be relatively non-rotatable. Thus, relative movement of pistons assemblies 8 toward the reaction members 9 brings the discs of pack 2 into frictional braking engagement thereby arresting any rotational movement of the wheel rim relative to torque tube 5. It will be appreciated that in the preferred embodiment of the invention as shown in FIG. 1 identical end stator discs 10 and 13 are used, and the whole of said load transmitting surfaces 12 and 15 of end stator discs 10 and 13 respectively are toughened. In FIG. 2 a sectional view of part of disc 10 is illustrated in which the density of the subsurface 'shading' represents the material structure varying progressively in the axial direction from surface 12 to surface 11. It will be understood that if desired there may be only localized toughening of a portion of each disc 10 and 13 in the annular region directly abutting reaction members 9 and insulating disc 16 respectively, in other words, a disc may be selectively toughened.

In prior art constructions of carbon composite brake assemblies, end discs are of identical chemical composition and physical properties as the other stator discs in the pack. Thus, hitherto it has been necessary to provide additional metal thrust or spreader plates at either end of the disc stack.

By eliminating spreader plates and thrust flanges it is thereby possible, if desired, to utilize end stator discs in accordance with the invention which are arially thicker than those which they replace. This gives rise to a useful improvement in thermal insulation because the stator material normally has lower thermal conductivity than the material of the plates and/or flange that it has replaced. Consequently, brake assemblies so constructed will operate longer before being prone to overheating of the brake cylinders. If preferred, intervening discs of the stack may be of greater thickness. Alternatively, as in the preferred embodiment, the increased 'strength' of the end discs permits the use of discs axially thinner than those which they replace. In this case the further provision of an insulating disc, such as disc 16, overcomes thermal disadvantages of using a thinner end disc adjacent the cylinder and piston assemblies.

It will have been appreciated that not only are the end stators subject to non-frictional loading, but also so are inner and outer peripheries 18 and 19 of the stator discs 3 and rotor discs 4 respectively. These peripheries are slotted so as to engage respective keyways 20 in the torque tube 5 and keyways in the wheel rim (not shown). Radial faces of these slots transmit the braking forces to the wheel and may suffer deformation as a result. Also, the peripheries move axially of the tube 5 or rim 14 and may suffer plastic deformation, fracture or wear. Consequently, in a still further embodiment of the invention the peripheral surface of the carbon composite brake discs are toughened to reduce wear, distortion and incidence of fracture normally found with carbon-carbon discs.

Clearly not all the surface area of the thrust face of the end stator discs, or, the keyway engaging peripheral surfaces of the stator and rotor discs, will be subject to load, or wear. Thus, in order to give the improved material characteristics required, it may be desirable to toughen only a portion of these surfaces; in other words, disc may be selectively toughened.

In all embodiments of the invention carbon composite brake discs of suitable shape may have a portion of their peripheral or face surfaces toughened in any one or more of the manners hereafter described. In particular the portion may be toughened by a needlepunching process, or by a chemical treatment process.

For the avoidance of doubt it should be understood that such toughening may be effected during a fibre manipulation process prior to the formation of carbon composite materials or once the composite structure has been formed. It will be appreciated that the expression "toughening" is taken to include hardening, stiffening or both, and that toughening a surface means that material underlying the surface is toughened. "Non-toughened" indicates that toughening as herein described has not intentionally been effected.

A preferred form of toughening is needlepunching during a fibre manipulation process prior to the formation of the carbon composite. Other toughened materials of progressively varying structure can be produced during the formation of the composite by incorporating ceramic particles or fibres, hard carbon particles or fibres, or an increased volume fraction of carbon fibres or carbon fibres orientated in different directions.

Alternatively once the carbon composite structure has been formed the "localized" conversion of the structure of the carbon to a harder or stiffer substance can be effected by chemical treatment, possibly thermochemical treatment. As an example of this it is believed that treatment by siliconising or chromizing will produce good results.

Treatment of the surface portion by liquid impregnation with polymer resin followed by a charring process is another alternative, as is impregnation with a metal or metalloid. Another treatment involves deposition of material following infiltration by a gaseous phase.

It will be understood that some of the toughening processes may result in a coating externally of the carbon composite giving rise to a material construction which in cross-section goes from carbon-carbon to another tougher material with the material structure varying therebetween.

We claim:

1. An annular carbon composite disc comprising an outer peripheral edge surface, an inner peripheral edge surface located radially inward relative to the outer peripheral edge surface, and two friction faces opposing each other between said outer peripheral edge surface and said inner peripheral edge surface, wherein said outer or inner peripheral edge surface is a slotted surface provided with slots for engaging keyways of a torque tube or wheel rim, wherein at least a portion of said slotted surface, and material underlying said slotted surfaces have been selectively toughened at least in part by needle-punching to provide increased resistance indentation damage and/or wear and/or fracture resulting from localized loads in the selectively toughened portion, wherein said friction faces are non-toughened.

2. A disc in accordance with claim 1, in which said portion is the whole of said peripheral surface provided with said slots.

3. A disc in accordance with claim 1, in which said portion is toughened by a chemical treatment process to effect localized conversion of carbon to a harder or stiffer substance.

4. A disc in accordance with claim 1 in which said portion is thermochemically treated.

5. A disc in accordance with claim 4, in which said thermochemical treatment is chromizing.

6. A disc in accordance with claim 4, in which said thermochemical treatment is siliconizing.

7. A disc in accordance with claim 1, in which said portion has the same volume fraction of carbon fibers as does said friction face.

8. A disc in accordance with claim 1, wherein said portion is treated by liquid impregnation, in which said liquid is a polymer resin which after impregnation has been charred.

9. A carbon composite disc in accordance with claim 1, wherein said portion is treated by liquid impregnation, in which said liquid is metal or metalloid.

10. A disc in accordance with claim 3, in which said treatment comprises deposition of material following infiltration at a gaseous phase.

11. A disc in accordance with claim 1, in which said portion has been treated to provide said portion with a coating.

12. A disc in accordance with claim 1, in which said portion is toughened during a fibre manipulation process prior to the formation of the carbon composite.

13. A disc in accordance with claim 1, having a material structure varying axially.

14. A brake disc stack comprising a stator disc in accordance with claim 1.

15. A brake disc stack comprising a rotor disc in accordance with claim 1.

16. A multi-disc carbon composite brake stack having a plurality of annular interleaved stator discs and rotor discs, each said disc having an inner periphery and an outer periphery, and a friction face between said inner periphery and said outer periphery, with one said periphery having a plurality of circumferentially spaced radially extending notches and teeth for engaging corresponding teeth and notches on a radially adjacent shaft and wheel, comprising:

localized reinforcement in the area of said disc notches and teeth which are formed by selective localized toughening of said disc along said periphery by needle-punching of said local areas during formation of said discs, said localized toughening extending axially through the thickness of said disc in said local area, said friction face of said respective disc being non-toughened.

17. A method for making an annular carbon composite disc comprising the steps of:

providing a preform for an annular carbon composite disc, said preform comprising an outer peripheral edge surface, an inner peripheral edge surface located radially inward relative to the outer peripheral edge surface, and two friction faces opposing each other between said outer peripheral edge surface and said inner peripheral edge surface, wherein said outer or inner peripheral edge surface is a slotted surface provided with slots for engaging keyways of a torque tube or wheel rim, selectively toughening at least a portion of said slotted surface and material underlying said slotted surface at least in part by needle-punching to provide increased resistance to indentation damage and/or wear and/or fracture resulting from localized loads in the selectively toughened portion, wherein said friction faces being non-toughened and treating said selectively toughened preform to convert it to a carbon composite disc.

18. A method in accordance with claim 17, in which said portion has the same volume fraction of carbon fibers as does said friction face.

19. A method in accordance with claim 17, wherein said portion is treated by liquid impregnation, in which said liquid is a polymer resin which after impregnation has been charred.

20. A method in accordance with claim 17, wherein said portion is treated by liquid impregnation, in which said liquid is metal or metalloid.

* * * * *